(12) United States Patent
Chen et al.

(10) Patent No.: US 11,835,791 B2
(45) Date of Patent: Dec. 5, 2023

(54) CAMERA OPTICAL LENS

(71) Applicant: AAC Optics (Changzhou) Co., Ltd., Changzhou (CN)

(72) Inventors: Jia Chen, Shenzhen (CN); Wen Sun, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 421 days.

(21) Appl. No.: 17/131,792

(22) Filed: Dec. 23, 2020

(65) Prior Publication Data

US 2022/0066134 A1 Mar. 3, 2022

(30) Foreign Application Priority Data

Aug. 26, 2020 (CN) .......................... 202010867245.X (51) Int. Cl.
*G02B 9/60* (2006.01)
*G02B 13/18* (2006.01)

(52) U.S. Cl.
CPC ............... *G02B 9/60* (2013.01); *G02B 13/18* (2013.01)

(58) Field of Classification Search
CPC ...... G02B 9/60; G02B 13/0045; G02B 13/18; G02B 13/06; G02B 15/144113; G02B 15/145511

See application file for complete search history.

(56) References Cited

U.S. PATENT DOCUMENTS

2015/0293331 A1* 10/2015 Yonezawa .......... G02B 13/0045
  359/714
2015/0316748 A1* 11/2015 Cheo ...................... G02B 7/005
  359/694

FOREIGN PATENT DOCUMENTS

| JP | 2015132687 A | * | 1/2014 | ............... G02B 3/04 |
| JP | 2015052686 A | * | 3/2015 | ......... G02B 13/0045 |
| JP | 2015132687 A | * | 7/2015 | ......... G02B 13/0045 |

* cited by examiner

*Primary Examiner* — William Choi
*Assistant Examiner* — Ray Alexander Dean
(74) *Attorney, Agent, or Firm* — W&G Law Group (57) ABSTRACT

The present invention provides a camera optical lens, including, from an object side to an image side, a first lens having a positive refractive power, a second lens having a negative refractive power, a third lens having a positive refractive power, a fourth lens having a positive refractive power, and a fifth lens having a negative refractive power. At least one of the first to fifth lenses has a free-form surface, and the camera optical lens satisfies: $2.00 \leq f3/f \leq 5.50$; $2.00 \leq R4/R3 \leq 23.00$, where f is a focal length of the camera optical lens, f3 is a focal length of the third lens, R3 is a central curvature radius of an object side surface of the second lens, and R4 is a central curvature radius of an image side surface of the second lens. The camera optical lens satisfies requirements of a large aperture, a wide angle and ultra-thinness, and has excellent optical performance.

10 Claims, 8 Drawing Sheets

CAMERA OPTICAL LENS

TECHNICAL FIELD

The present invention relates to the field of optical lenses, and more particularly, to a camera optical lens suitable for portable terminal devices such as smart phones and digital cameras, and for imaging devices such as monitors and PC lenses.

BACKGROUND

With the development of camera lenses, higher and higher requirements are put forward for imaging quality of the lenses. The "night scene photography" and "bokeh" of the lens have also become important indexes to measure the imaging performances of the lens. At present, rotationally symmetric aspherical surfaces are mostly used. Such an aspherical surface has a sufficient degree of freedom only in a meridian plane, and cannot well correct off-axis aberration. The existing structures have insufficient refractive power allocation, lens spacing and lens shape settings, resulting in insufficient ultra-thinness and wide angle of the lenses. A free-form surface is a non-rotationally symmetric surface, which can better balance aberration and improve the imaging quality; besides, processing of the free-form surface has gradually become mature. With the increasing requirements for imaging of the lens, it is very important to provide a free-form surface in the design of a lens, especially in the design of wide-angle and ultra-wide-angle lenses.

SUMMARY

In view of the above-mentioned problems, a purpose of the present invention is to provide a camera optical lens, which has the characteristics of a large aperture, a wide angle and ultra-thinness, as well as excellent optical performance.

In order to solve the above-mentioned technical problem, an embodiment of the present invention provide a camera optical lens, including, from an object side to an image side, a first lens having a positive refractive power, a second lens having a negative refractive power, a third lens having a positive refractive power, a fourth lens having a positive refractive power, and a fifth lens having a negative refractive power. At least one of the first lens to the fifth lens has a free-form surface, and the camera optical lens satisfies following conditions: $2.00 \leq 3/f \leq 5.50$; and $2.00 \leq R4/R3 \leq 23.00$, where f is a focal length of the camera optical lens, f3 is a focal length of the third lens, R3 is a central curvature radius of an object side surface of the second lens, and R4 is a central curvature radius of an image side surface of the second lens.

In an improved embodiment, the camera optical lens further satisfies a following condition: $1.00 \leq d7/d8 \leq 11.00$, where d7 is an on-axis thickness of the fourth lens, and d8 is an on-axis distance from an image side surface of the fourth lens to an object side surface of the fifth lens.

In an improved embodiment, the camera optical lens further satisfies following conditions: $0.46 \leq f1/f \leq 1.55$; $-3.88 \leq (R1+R2)/(R1-R2) \leq -1.02$; and $0.06 \leq d1/TTL \leq 0.22$, where f1 is a focal length of the first lens, R1 is a central curvature radius of an object side surface of the first lens, R2 is a central curvature radius of an image side surface of the first lens, d1 is an on-axis thickness of the first lens, and TTL is a total optical length from the object side surface of the first lens to an image plane of the camera optical lens along an optic axis.

In an improved embodiment, the camera optical lens further satisfies following conditions: $-6.97 \leq f2/f \leq -1.24$; $-5.62 \leq (R3+R4)/(R3-R4) \leq -0.73$; and $0.02 \leq d3/TTL \leq 0.08$, where f2 is a focal length of the second lens, d3 is an on-axis thickness of the second lens, and TTL is a total optical length from an object side surface of the first lens to an image plane of the camera optical lens along the optic axis.

In an improved embodiment, the camera optical lens further satisfies following conditions: $-3.37 \leq (R5+R6)/(R5-R6) \leq 0.16$; and $0.03 \leq d5/TTL \leq 0.26$, where R5 is a central curvature radius of an object side surface of the third lens, R6 is a central curvature radius of an image side surface of the third lens, d5 is an on-axis thickness of the third lens, and TTL is a total optical length from an object side surface of the first lens to an image plane of the camera optical lens along the optic axis.

In an improved embodiment, the camera optical lens further satisfies following conditions: $0.55 \leq f4/f \leq 6.42$; $0.57 \leq (R7+R8)/(R7-R8) \leq 2.93$; and $0.06 \leq d7/TTL \leq 0.19$, where f4 is a focal length of the fourth lens, R7 is a central curvature radius of an object side surface of the fourth lens, R8 is a central curvature radius of an image side surface of the fourth lens, d7 is an on-axis thickness of the fourth lens, and TTL is a total optical length from an object side surface of the first lens to an image plane of the camera optical lens along the optic axis.

In an improved embodiment, the camera optical lens further satisfies following conditions: $-3.13 \leq f5/f \leq -0.51$; $0.74 \leq (R9+R10)/(R9-R10) \leq 4.97$; and $0.05 \leq d9/TTL \leq 0.25$, where f5 is a focal length of the fifth lens, R9 is a central curvature radius of an object side surface of the fifth lens, R10 is a central curvature radius of an image side surface of the fifth lens, d9 is an on-axis thickness of the fifth lens, and TTL is a total optical length from an object side surface of the first lens to an image plane of the camera optical lens along the optic axis.

In an improved embodiment, the camera optical lens further satisfies: $TTL/IH \leq 1.60$, where TTL is a total optical length from an object side surface of the first lens to an image plane of the camera optical lens along the optic axis, and IH is an image height of the camera optical lens.

In an improved embodiment, the camera optical lens further satisfies a following condition: $FOV \geq 77°$, where FOV is a field of view of the camera optical lens.

In an improved embodiment, the camera optical lens further satisfies a following condition: $FNO \leq 2.21$, where FNO is an F number of the camera optical lens The beneficial effects of the present invention are as follows. The camera optical lens according to the present invention has the characteristics of a large aperture, a wide angle and ultra-thinness, as well as excellent optical performance. Meanwhile, at least one of the first lens to the fifth lens has a free-form surface, which is beneficial to correct distortion and field curvature of the system and improve the performance of the optical system, and is especially suitable for mobile phone camera lens assembly and WEB camera lens composed of imaging elements such as CCD and CMOS for high-pixels.

BRIEF DESCRIPTION OF DRAWINGS

In order to more clearly illustrate technical solutions in embodiments of the present invention, the accompanying drawings used in the embodiments are briefly introduced as follows. It should be noted that the drawings described as follows are merely part of the embodiments of the present invention, and other drawings can also be acquired by those skilled in the art without paying creative efforts.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figures and the embodiments. It should be understood the specific embodiments described hereby is only to explain the invention, not intended to limit the invention.

Embodiment 1

Figure 1:
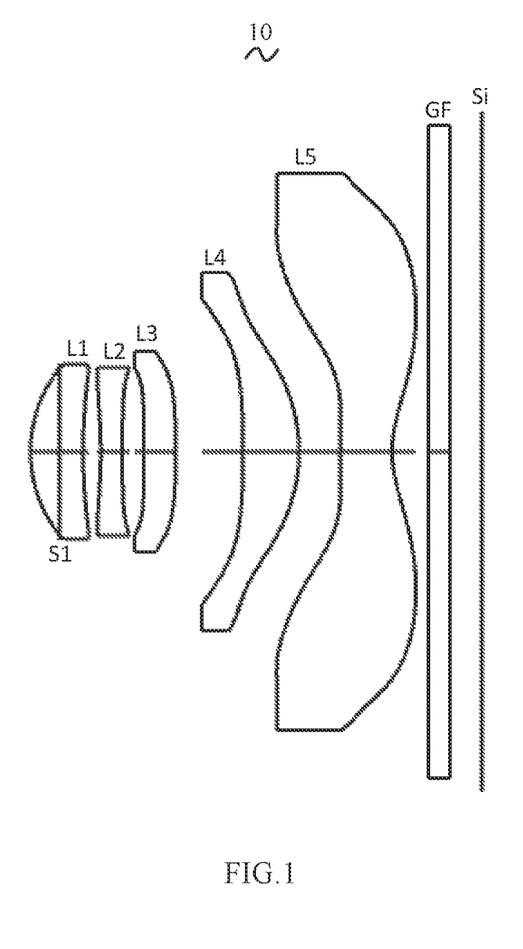
FIG. 1 is a schematic structural diagram of a camera optical lens according to a first embodiment of the present invention.

With reference to the accompanying drawings, the present invention provides a camera optical lens 10. FIG. 1 illustrates a camera optical lens 10 according to Embodiment 1 of the present invention. The camera optical lens 10 includes five lenses. Specifically, the camera optical lens 10 includes, from an object side to an image side, an aperture S1, a first lens L1, a second lens L2, a third lens L3, a fourth lens L4, and a fifth lens L5. Optical elements such as an optical filter GF may be arranged between the fifth lens L5 and an image surface Si.

In this embodiment, the first lens L1 is made of a plastic material, the second lens L2 is made of a plastic material, the third lens L3 is made of a plastic material, the fourth lens L4 is made of a plastic material, and the fifth lens L5 is made of a plastic material. In other embodiments, the lenses may be made of other materials.

In this embodiment, at least one of the first lens L1 to the fifth lens L5 includes a free-form surface, and the free-form surface is beneficial to correct distortion and field curvature of the system, and improve imaging quality.

In this embodiment, it is defined that a focal length of the camera optical lens 10 is f, a focal length of the third lens L3 is f3, and the camera optical lens satisfies the following condition: $2.00 \leq f3/f \leq 5.50$, which specifies a ratio of the focal length of the third lens to the focal length of the camera optical lens. Within a range defined by this range, it is beneficial to improving the imaging quality. As an example, the camera optical lens satisfies the following condition: $2.21 \leq f3/f \leq 5.48$.

It is defined that a central curvature radius of an object side surface of the second lens L2 is R3, a central curvature radius of an image side surface of the second lens L2 is R4, and the camera optical lens satisfies the following condition: $2.00 \leq R4/R3 \leq 23.00$, which specifies a shape of the second lens. Within a range defined by this condition, it is beneficial to reduce a degree of light deflection and improve the imaging quality.

It is defined that an on-axis thickness of the fourth lens L4 is d7, and an on-axis distance from an image side surface of the fourth lens L4 to an object side surface of the fifth lens is d8, and the camera optical lens satisfies the following condition: $1.00 \leq d7/d8 \leq 11.00$. Within a range defined by this condition, it is beneficial to reduce the total length of the system. As an example, the camera optical lens satisfies the following condition: $1.17 \leq d7/d8 \leq 10.64$.

In this embodiment, the first lens L1 has a positive refractive power, the object side surface of the first lens L1 is a convex surface at a paraxial position, and the image side surface of the first lens L1 is a concave surface at a paraxial position.

It is defined that a focal length of the first lens L1 is f1, a focal length of the camera optical lens 10 is f, and the camera optical lens satisfies the following condition: $0.46 \leq f1/f \leq 1.55$, which defines a ratio of the focal length of the first lens L1 to the focal length of the camera optical lens 10. Within a range defined by this condition, the first lens has an appropriate positive refractive power, which is beneficial to reduce aberration of the system and achieve ultra-thinness and a wide angle of the camera optical lens. As an example, the camera optical lens satisfies the following condition: $0.74 \leq f1/f \leq 1.24$.

A central curvature radius of the object side surface of the first lens L1 is R1, a central curvature radius of the image side surface of the first lens L1 is R2, and the camera optical lens satisfies the following condition: $-3.88 \leq (R1+R2)/(R1-R2) \leq -1.02$. By reasonably controlling the shape of the first lens L1, the first lens L1 can effectively correct spherical aberration of the system. As an example, the camera optical lens satisfies the following condition: $-20.42 \leq (R1+R2)/(R1-R2) \leq -1.27$.

An on-axis thickness of the first lens L1 is d1, a total optical length from the object side surface of the first lens to an image plane of the camera optical lens 10 along the optic axis is TTL, and the camera optical lens satisfies the following condition: $0.06 \leq d1/TTL \leq 0.22$. Within a range defined by this condition, it is beneficial to achieve ultra-thinness. As an example, the camera optical lens satisfies the following condition: $0.09 \leq d1/TTL \leq 0.17$.

In this embodiment, the second lens L2 has a negative refractive power, the object side surface of the second lens L2 is a concave surface at a paraxial position, and the image side surface of the second lens L2 is a convex surface at a paraxial position.

It is defined that a focal length of the second lens L2 is f2, a focal length of the camera optical lens 10 is f, and the camera optical lens satisfies the following condition: $-6.97 \leq f2/f \leq -1.24$. By controlling the negative refractive power of the second lens L2 within a reasonable range, it is beneficial to correct aberration of the optical system. As an example, the camera optical lens satisfies the following condition: $-4.36 \leq f2/f \leq -1.56$.

A central curvature radius of the object side surface of the second lens L2 is R3, a central curvature radius of the image side surface of the second lens L2 is R4, and the camera optical lens satisfies the following condition: $-5.62 \leq (R3+R4)/(R3-R4) \leq -0.73$, which specifies a shape of the second lens L2. Within a range defined by this condition, with the development of ultra-thinness and wide angle of the camera optical lens, it is beneficial to correct on-axis aberration. As an example, the camera optical lens satisfies the following condition: $-3.51 \leq (R3+R4)/(R3-R4) \leq -0.91$.

An on-axis thickness of the second lens L2 is d3, a total optical length from the object side surface of the first lens to an image plane of the camera optical lens 10 along the optic axis is TTL, and the camera optical lens satisfies the following condition: $0.02 \leq d3/TTL \leq 0.08$. Within a range defined by this condition, it is beneficial to achieve ultra-thinness. As an example, the camera optical lens satisfies the following condition: $0.04 \leq d3/TTL \leq 0.06$.

In this embodiment, the third lens L3 has a positive refractive power, the object side surface of the third lens L3 is a convex surface at a paraxial position, and the image side surface of the third lens L3 is a convex surface at a paraxial position.

It is defined that a central curvature radius of the object side surface of the third lens L3 is R5, a central curvature radius of the image side surface of the third lens L3 is R6, and the camera optical lens satisfies the following condition: $-3.37 \leq (R5+R6)/(R5-R6) \leq 0.16$, which specifies a shape of the third lens. Within a range defined by this condition, it is beneficial to alleviate a degree of deflection of light passing through the lens, and effectively reduce aberration. As an example, the camera optical lens satisfies the following condition: $-2.11 \leq (R5+R6)/(R5-R6) \leq 0.13$.

An on-axis thickness of the third lens L3 is d5, a total optical length from the object side surface of the first lens to an image plane of the camera optical lens 10 along the optic axis is TTL, and the camera optical lens satisfies the following condition: $0.03 \leq d5/TTL \leq 0.26$. Within a range defined by this condition, it is beneficial to achieve ultra-thinness. As an example, the camera optical lens satisfies the following condition: $0.06 \leq d5/TTL \leq 0.20$.

In this embodiment, the fourth lens L4 has a positive refractive power, the object side surface of the fourth lens L4 is a concave surface at a paraxial position, and the image side surface of the fourth lens L4 is a convex surface at a paraxial position.

It is defined that a focal length of the fourth lens L4 is f4, a focal length of the camera optical lens 10 is f, and the camera optical lens satisfies the following condition: $0.55 \leq f4/f \leq 6.42$, which specifies a ratio of the focal length of the fourth lens to the focal length of the system. Within a range defined by this condition, it is beneficial to improve the performance of the optical system. As an example, the camera optical lens satisfies the following condition: $0.88 \leq f4/f \leq 5.14$.

A central curvature radius of the object side surface of the fourth lens L4 is R7, a central curvature radius of the image side surface of the fourth lens L4 is R8, and the camera optical lens satisfies the following condition: $0.57 \leq (R7+R8)/(R7-R8) \leq 2.93$, which specifies a shape of the fourth lens L4. Within a range defined by this condition, with the development of ultra-thinness and wide-angle, it is beneficial to correct off-axis aberration. As an example, the camera optical lens satisfies the following condition: $0.91 \leq (R7+R8)/(R7-R8) \leq 2.35$.

An on-axis thickness of the fourth lens L4 is d7, a total optical length from the object side surface of the first lens to an image plane of the camera optical lens 10 along the optic axis is TTL, and the camera optical lens satisfies the following condition: $0.06 \leq d7/TTL \leq 0.19$. Within a range defined by this condition, it is beneficial to achieve ultra-thinness. As an example, the camera optical lens satisfies the following condition: $0.09 \leq d7/TTL \leq 0.16$.

In this embodiment, the fifth lens L5 has a negative refractive power, the object side surface of the fifth lens L5 is a convex surface at a paraxial position, and the image side surface of the fifth lens L5 is a concave surface at a paraxial position.

It is defined that a focal length of the fifth lens L5 is f5, a focal length of the camera optical lens 10 is f, and the camera optical lens satisfies the following condition: $-3.13 \leq f5/f \leq -0.51$. The limitation on the fifth lens L5 can effectively smooth a light angle of the camera lens and reduce tolerance sensitivity. As an example, the camera optical lens satisfies the following condition: $-1.96 \leq f5/f \leq -0.64$.

A central curvature radius of the object side surface of the fifth lens is R9, a central curvature radius of the image side surface of the fifth lens is R10, and the camera optical lens satisfies the following condition: $0.74 \leq (R9+R10)/(R9-R10) \leq 4.97$, which specifies a shape of the fifth lens L5. Within a range defined by this condition, with the development of ultra-thinness and wide angle, it is beneficial to correct off-axis aberration. As an example, the camera optical lens satisfies the following condition: $1.19 \leq (R9+R10)/(R9-R10) \leq 3.97$.

An on-axis thickness of the fifth lens L5 is d9, a total optical length from the object side surface of the first lens to an image plane of the camera optical lens 10 along the optic axis is TTL, and the camera optical lens satisfies the following condition: $0.05 \leq d9/TTL \leq 0.25$. Within a range defined by this condition, it is beneficial to achieve ultra-thinness. As an example, the camera optical lens satisfies the following condition: $0.09 \leq d9/TTL \leq 0.20$.

In this embodiment, the total optical length from the object side surface of the first lens to an image plane of the camera optical lens 10 along the optic axis is TTL, an image height of the camera optical lens 10 is IH, and the camera optical lens satisfies the following condition: $TTL/IH \leq 1.60$, thereby achieving ultra-thinness.

In this embodiment, the field of view of the camera optical lens is FOV, which satisfies the following condition: $FOV \geq 77°$, thereby achieving a wide angle.

In this embodiment, an F number of the camera optical lens 10 is FNO, which is smaller than or equal to 2.21. This large aperture leads to good imaging performance.

When the above-mentioned conditions are satisfied, the camera optical lens 10 has good optical performance, and when the free-form surface is adopted, the designed image surface area can be matched with an actual use area, thereby improving the image quality of the effective area to the greatest extent; and based on the characteristics of the camera optical lens 10, the camera optical lens 10 is especially suitable for a mobile phone camera lens assembly and a WEB camera lens composed of imaging elements such as CCD and CMOS for high pixels.

Table 1 and Table 2 show design data of the camera optical lens 10 according to Embodiment 1 of the present invention. Herein, only the object side surface and the image side surface of the fifth lens L5 are free-form surfaces, but in other embodiments, more than one lens may have the free-form surface.

TABLE 1

|    | R       | d     |     | nd     |    | vd    |
|----|---------|-------|-----|--------|----|-------|
| S1 | ∞       | d0 =  -0.279 |     |        |    |       |
| R1 | 1.470   | d1 =  0.511  | nd1 | 1.5444 | v1 | 55.82 |
| R2 | 6.612   | d2 =  0.172  |     |        |    |       |
| R3 | -4.465  | d3 =  0.210  | nd2 | 1.6700 | v2 | 19.39 |
| R4 | -40.088 | d4 =  0.203  |     |        |    |       |
| R5 | 15.217  | d5 =  0.312  | nd3 | 1.5444 | v3 | 55.82 |
| R6 | -18.722 | d6 =  0.655  |     |        |    |       |
| R7 | -10.033 | d7 =  0.544  | nd4 | 1.5444 | v4 | 55.82 |
| R8 | -1.783  | d8 =  0.401  |     |        |    |       |
| R9 | 5.837   | d9 =  0.501  | nd5 | 1.5444 | v5 | 55.82 |
| R10| 1.148   | d10 = 0.355  |     |        |    |       |
| R11| ∞       | d11 = 0.210  | ndg | 1.5168 | vg | 64.17 |
| R12| ∞       | d12 = 0.308  |     |        |    |       |

The symbols described in this embodiment are defined as follows. The focal length, the on-axis distance, the curvature radius, and the on-axis thickness are all expressed in unit of mm.

TTL: total optical length (an on-axis distance from the object side surface of the first lens L1 to the image plane), in unit of mm;

F number (FNO): a ratio of an effective focal length of the camera optical lens to an entrance pupil diameter;

S1: aperture;

R: curvature radius at a center of an optical surface;

R1: central curvature radius of an object side surface of the first lens L1;

R2: central curvature radius of an image side surface of the first lens L1;

R3: central curvature radius of an object side surface of the second lens L2;

R4: central curvature radius of an image side surface of the second lens L2;

R5: central curvature radius of an object side surface of the third lens L3;

R6: central curvature radius of an image side surface of the third lens L3;

R7: central curvature radius of an object side surface of the fourth lens L4;

R8: central curvature radius of an image side surface of the fourth lens L4;

R9: central curvature radius of an object side surface of the fifth lens L5;

R10: central curvature radius of an image side surface of the fifth lens L5;

R11: central curvature radius of an object side surface of the optical filter GF;

R12: central curvature radius of an image side surface of the optical filter GF;

d: on-axis thickness of a lens, on-axis distance between lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the fifth lens L5;

d9: on-axis thickness of the fifth lens L5;

d10: on-axis distance from an image side surface of the fifth lens L5 to an object side surface of the optical filter GF;

d11: on-axis thickness of the optical filter GF;

d12: on-axis distance from an image side surface of the optical filter GF to the image plane;

nd: refractive index distance of d-line;

nd1: refractive index of d-line of the first lens L1;

nd2: refractive index of d-line of the second lens L2;

nd3: refractive index of d-line of the third lens L3;

nd4: refractive index of d-line of the fourth lens L4;

nd5: refractive index of d-line of the fifth lens L5;

ndg: refractive index of d-line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

vg: abbe number of the optical filter GF.

Table 2 shows aspherical data of the respective lenses in the camera optical lens 10 according to Embodiment 1 of the present invention.

TABLE 2

| | Cone coefficient | Aspherical coefficient | | | | |
|---|---|---|---|---|---|---|
| | k | A4 | A6 | A8 | A10 | A12 |
| R1 | 1.0694E-01 | -1.8014E-03 | 1.1418E-01 | -9.0120E-01 | 4.3294E+00 | -1.2316E+01 |
| R2 | 2.1373E+01 | 1.9047E-03 | -1.6352E-01 | 1.8814E+00 | -1.1423E+01 | 4.1600E+01 |
| R3 | -1.4189E+02 | -4.5541E-02 | 1.5331E-01 | 1.3335E+00 | -1.0352E+01 | 3.7378E+01 |
| R4 | 1.9622E+03 | 1.5073E-01 | -2.6336E-01 | 2.9508E+00 | -1.7511E+01 | 6.0648E+01 |
| R5 | -5.9276E+01 | -1.9497E-01 | 6.7150E-01 | -5.3649E+00 | 2.6892E+01 | -8.9158E+01 |
| R6 | 3.1312E+02 | -1.3847E-01 | 2.7738E-01 | -1.6950E+00 | 6.0166E+00 | -1.4446E+01 |
| R7 | 2.9608E+01 | -4.2514E-03 | -8.1464E-03 | -2.0692E-01 | 4.7434E-01 | -5.2416E-01 |
| R8 | -1.6873E-01 | 1.7285E-02 | -2.3616E-03 | -6.8099E-02 | 1.1639E-01 | -7.3115E-02 |

| | Cone coefficient | Aspherical coefficient | | | |
|---|---|---|---|---|---|
| | k | A14 | A16 | A18 | A20 |
| R1 | 1.0694E-01 | 2.1408E+01 | -2.2329E+01 | 1.2883E+01 | -3.1796E+00 |
| R2 | 2.1373E+01 | -9.2272E+01 | 1.2076E+02 | -8.5400E+01 | 2.5036E+01 |
| R3 | -1.4189E+02 | -8.1118E+01 | 1.0557E+02 | -7.5170E+01 | 2.2296E+01 |

TABLE 2-continued

| | | | | | |
|---|---|---|---|---|---|
| R4 | 1.9622E+03 | −1.2679E+02 | 1.5704E+02 | −1.0561E+02 | 2.9701E+01 |
| R5 | −5.9276E+01 | 1.8692E+02 | −2.3709E+02 | 1.6485E+02 | −4.7810E+01 |
| R6 | 3.1312E+02 | 2.2410E+01 | −2.1279E+01 | 1.1125E+01 | −2.4077E+00 |
| R7 | 2.9608E+01 | 3.2927E−01 | −1.2014E−01 | 2.4084E−02 | −2.0868E−03 |
| R8 | −1.6873E−01 | 2.3859E−02 | −4.3505E−03 | 4.2636E−04 | −1.8018E−05 |

$$z = (cr^2)/\{1+[1-(k+1)(c^2r^2)]^{1/2}\} + A4r^4 + A6r^6 + A8r^8 + A10r^{10} + A12r^{12} + A14r^{14} + A16r^{16} + A18r^{18} + A20r^{20} \quad (1)$$

Herein, k represents a cone coefficient, A4, A6, A8, A10, A12, A14, A16, A18, and A20 represent aspherical coefficients, c represents the curvature at the center of the optical surface, r represents a vertical distance between a point on an aspherical curve and the optical axis, Z represents an aspherical depth (a vertical distance between a point on the aspherical surface that is distanced from the optical axis by r and a surface tangent to a vertex of the aspherical surface on the optic axis).

For convenience, the aspherical surface of each lens adopts the aspherical surface shown in the above equation (1). However, the present invention is not limited to the aspherical surface defined by the polynomial expressed by the equation (1).

Table 3 shows free-form surface data in the camera optical lens 10 according to Embodiment 1 of the present invention.

TABLE 3

Free-form surface coefficient

| | k | $X^4Y^0$ | $X^2Y^2$ | $X^0Y^4$ | $X^6Y^0$ | $X^4Y^2$ | $X^2Y^4$ | $X^0Y^6$ |
|---|---|---|---|---|---|---|---|---|
| R9 | −1.2270E+01 | −3.8286E−01 | −7.6214E−01 | −3.8313E−01 | 2.2104E−01 | 6.6291E−01 | 6.6278E−01 | 2.2147E−01 |
| R10 | −4.4020E+00 | −1.9005E−01 | −3.7177E−01 | −1.9031E−01 | 1.4052E−01 | 4.2019E−01 | 4.1949E−01 | 1.4053E−01 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R9 | 4.2125E−01 | 2.1073E−01 | 4.2109E−02 | −1.8515E−02 | −1.1113E−01 | −2.7775E−01 | −3.7031E−01 | −2.7773E−01 |
| R10 | 2.7432E−01 | 1.3717E−01 | 2.7437E−02 | −7.0621E−03 | −4.2375E−02 | −1.0593E−01 | −1.4123E−01 | −1.0593E−01 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R9 | 3.6762E−02 | 5.2482E−03 | −8.6829E−04 | −6.9495E−03 | −2.4320E−02 | −4.8634E−02 | −6.0794E−02 | −4.8634E−02 |
| R10 | 8.5596E−03 | 1.2227E−03 | −1.3501E−04 | −1.0799E−03 | −3.7785E−03 | −7.5601E−03 | −9.4529E−03 | −7.5592E−03 |

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R9 | 9.6790E−03 | 6.4525E−03 | 2.7643E−03 | 6.9126E−04 | 7.7205E−05 | −2.8321E−06 | −2.8162E−05 | −1.2687E−04 |
| R10 | 1.0754E−03 | 7.1606E−04 | 3.0692E−04 | 7.6789E−05 | 8.5271E−06 | −2.3274E−07 | −2.3323E−06 | −1.0501E−05 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R9 | −8.7697E−02 | −3.5186E−01 | −5.2762E−01 | −3.5184E−01 | −8.7857E−02 | 4.2056E−02 | 2.1092E−01 | 4.2123E−01 |
| R10 | −7.3980E−02 | −2.9572E−01 | −4.4400E−01 | −2.9546E−01 | −7.3967E−02 | 2.7435E−02 | 1.3717E−01 | 2.7440E−01 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R9 | −1.1106E−01 | −1.8524E−02 | 5.2529E−03 | 3.6762E−02 | 1.1030E−01 | 1.8384E−01 | 1.8385E−01 | 1.1028E−01 |
| R10 | −4.2379E−02 | −7.0624E−03 | 1.2228E−03 | 8.5601E−03 | 2.5678E−02 | 4.2799E−02 | 4.2803E−02 | 2.5681E−02 |

| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|---|---|---|---|---|---|---|---|---|
| R9 | −2.4323E−02 | −6.9504E−03 | −8.6782E−04 | 7.6867E−05 | 6.9133E−04 | 2.7653E−03 | 6.4527E−03 | 9.6759E−03 |
| R10 | −3.7804E−03 | −1.0800E−03 | −1.3503E−04 | 8.5271E−06 | 7.6746E−05 | 3.0681E−04 | 7.1658E−04 | 1.0739E−03 |

| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|---|---|---|---|---|---|---|---|---|
| R9 | −3.3856E−04 | −5.9232E−04 | −7.1197E−04 | −5.9224E−04 | −3.3798E−04 | −1.2711E−04 | −2.7818E−05 | −2.8794E−06 |
| R10 | −2.8028E−05 | −4.8964E−05 | −5.8640E−05 | −4.9135E−05 | −2.8016E−05 | −1.0448E−05 | −2.3371E−06 | −2.3237E−07 |

$$z = \frac{cr^2}{1+\sqrt{1-(1+k)c^2r^2}} + \sum_{i=1}^{N} B_i E_i(x, y) \qquad (2)$$

Herein, k represents a cone coefficient, Bi represents an aspherical coefficient, $E_i(x,y)=x^m y^n$ (where values of m and n correspond to the $x^m y^n$ items listed in Table 3), c represents the curvature at the center of the optical surface, r represents a vertical distance between a point on the free-form surface and the optical axis, x represents the x-direction component of r, y represents the y-direction component of r, z represents aspherical depth (a vertical distance between a point on the aspherical surface that is distanced from the optical axis by r and a surface tangent to a vertex of the aspherical surface on the optic axis). In this embodiment, N=63, and in other embodiments, N may take other values.

For convenience, each free-form surface adopts the surface type defined by the extended polynomial shown in the above equation (2). However, the present invention is not limited to the free-form surface defined by the polynomial expressed by the equation (2).

Figure 2:
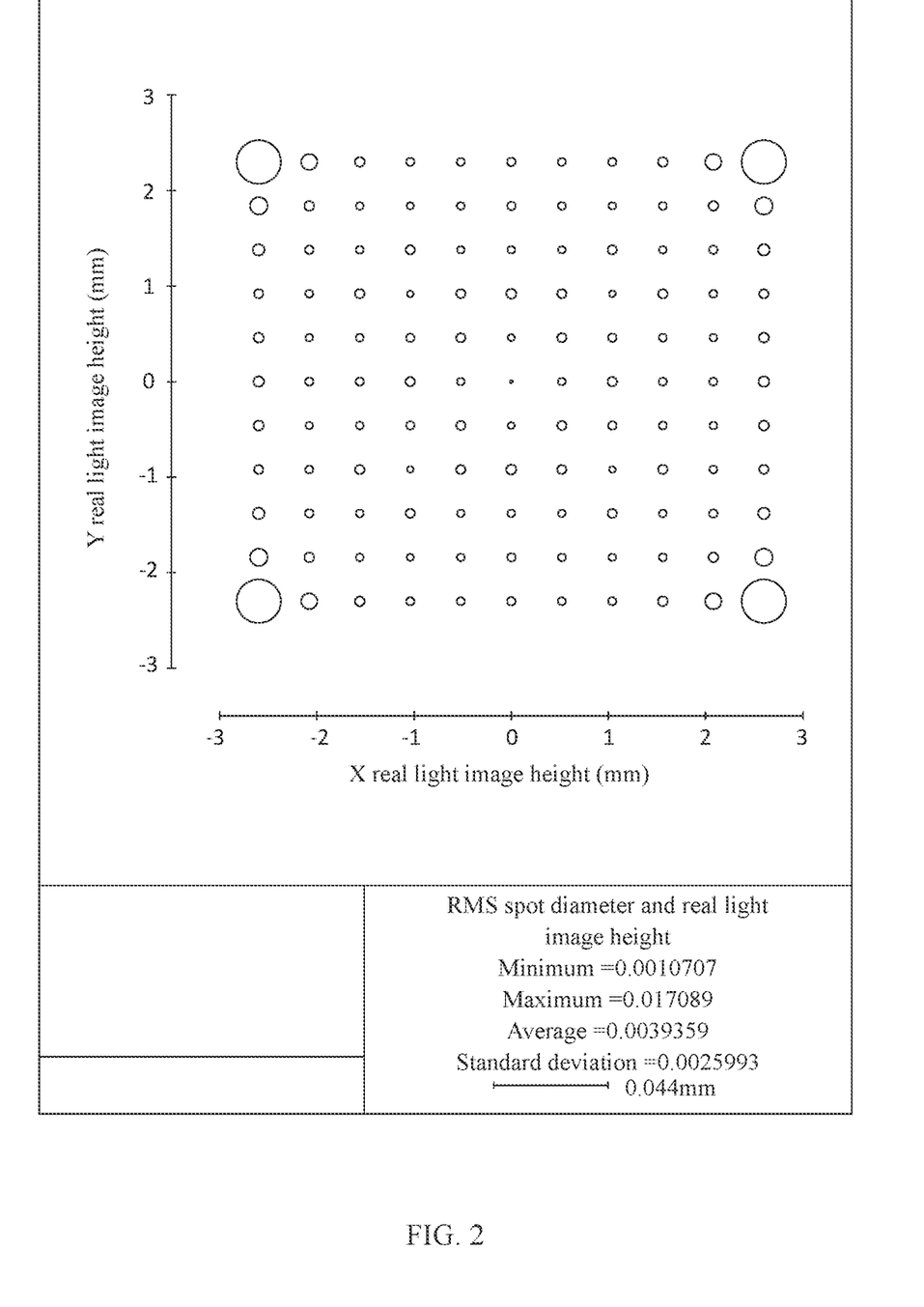
FIG. 2 illustrates correspondence between an RMS spot diameter of the camera optical lens shown in FIG. 1 and a real light image height.

FIG. 2 illustrates correspondence between the RMS spot diameter of the camera optical lens of Embodiment 1 and a real light image height. According to FIG. 2, it can be seen that the camera optical lens 10 according to Embodiment 1 can achieve good imaging quality.

Various numerical values and the parameters already specified in the conditions in this embodiments are listed in Table 13.

As shown in Table 13, Embodiment 1 satisfies respective conditions.

In this embodiment, an entrance pupil diameter ENPD of the camera optical lens 10 is 1.770 mm, the full field of view image height IH (in a diagonal direction) is 6.940 mm, the image height in an x direction is 5.200 mm, the image height in a y direction is 4.600 mm, and the imaging effect is the best in this rectangular area; the field of view FOV in a diagonal direction is 87.13°, the FOV in the x direction is 70.99°, and the FOV in the y direction is 64.45°. The camera optical lens 10 satisfies the design requirements of a wide angle, ultra-thinness and a large aperture, and its on-axis and off-axis color aberrations are sufficiently corrected, and the camera optical lens has excellent optical characteristics.

Embodiment 2

Embodiment 2 is basically the same as Embodiment 1, the symbols in Embodiment 2 are the same as those in Embodiment 1, and only the difference thereof will be described in the following.

Figure 3:
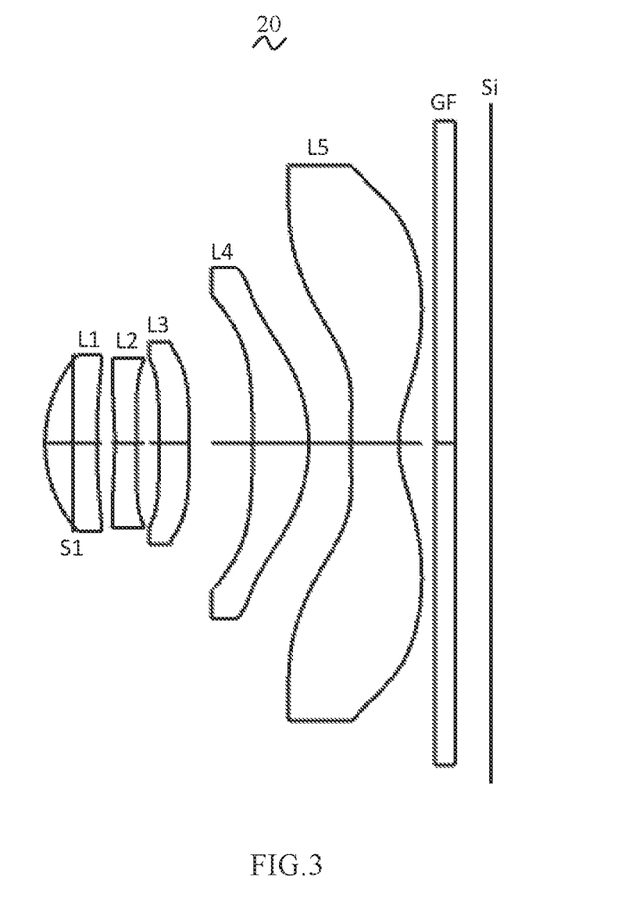
FIG. 3 is a schematic structural diagram of a camera optical lens according to Embodiment 2 of the present invention.

Table 4 and Table 5 show design data of the camera optical lens 20 according to Embodiment 2 of the present invention. Herein, only the object side surface and the image side surface of the second lens L2 are free-form surfaces, but in other embodiments, more than one lens may have the free-form surface.

TABLE 4

|  | R | d |  | nd |  | vd |
| --- | --- | --- | --- | --- | --- | --- |
| S1 | ∞ | d0 = | −0.279 |  |  |  |
| R1 | 1.467 | d1 = | 0.511 | nd1 | 1.5444 | v1 55.82 |
| R2 | 7.055 | d2 = | 0.176 |  |  |  |
| R3 | −4.548 | d3 = | 0.210 | nd2 | 1.6700 | v2 19.39 |
| R4 | −39.823 | d4 = | 0.220 |  |  |  |
| R5 | 23.838 | d5 = | 0.304 | nd3 | 1.5444 | v3 55.82 |
| R6 | −19.197 | d6 = | 0.624 |  |  |  |
| R7 | −8.880 | d7 = | 0.551 | nd4 | 1.5444 | v4 55.82 |
| R8 | −1.764 | d8 = | 0.410 |  |  |  |
| R9 | 4.577 | d9 = | 0.473 | nd5 | 1.5444 | v5 55.82 |
| R10 | 1.111 | d10 = | 0.351 |  |  |  |
| R11 | ∞ | d11 = | 0.210 | ndg | 1.5168 | vg 64.17 |
| R12 | ∞ | d12 = | 0.344 |  |  |  |

Table 5 shows aspherical data of the respective lenses in the camera optical lens 20 according to Embodiment 2 of the present invention.

TABLE 5

| | Cone coefficient | Aspherical coefficient | | | | |
| --- | --- | --- | --- | --- | --- | --- |
| | k | A4 | A6 | A8 | A10 | A12 |
| R1 | 8.8779E−02 | −9.4426E−03 | 1.2741E−01 | −9.1536E−01 | 4.3195E+00 | −1.2314E+01 |
| R2 | 1.7022E+01 | 2.4556E−03 | −1.7272E−01 | 1.8865E+00 | −1.1413E+01 | 4.1599E+01 |
| R5 | 1.1761E+02 | −1.9509E−01 | 6.5241E−01 | −5.3450E+00 | 2.6907E+01 | −8.9158E+01 |
| R6 | 3.3322E+02 | −1.4512E−01 | 2.7901E−01 | −1.6970E+00 | 6.0171E+00 | −1.4445E+01 |
| R7 | 2.1562E+01 | −2.0726E−04 | −1.1422E−02 | −2.0835E−01 | 4.7455E−01 | −5.2397E−01 |
| R8 | −1.7556E−01 | 2.1303E−02 | −3.2251E−03 | −6.8579E−02 | 1.1629E−01 | −7.3081E−02 |
| R9 | −2.7287E+01 | −3.7927E−01 | 2.2117E−01 | −8.7972E−02 | 4.2120E−02 | −1.8515E−02 |
| R10 | −4.5597E+00 | −1.9109E−01 | 1.4040E−01 | −7.3939E−02 | 2.7440E−02 | −7.0621E−03 |

| | Cone coefficient | Aspherical coefficient | | | |
| --- | --- | --- | --- | --- | --- |
| | k | A14 | A16 | A18 | A20 |
| R1 | 8.8779E−02 | 2.1416E+01 | −2.2325E+01 | 1.2880E+01 | −3.1877E+00 |
| R2 | 1.7022E+01 | −9.2289E+01 | 1.2075E+02 | −8.5363E+01 | 2.5042E+01 |
| R5 | 1.1761E+02 | 1.8691E+02 | −2.3709E+02 | 1.6487E+02 | −4.7758E+01 |
| R6 | 3.3322E+02 | 2.2412E+01 | −2.1277E+01 | 1.1125E+01 | −2.4091E+00 |
| R7 | 2.1562E+01 | 3.2938E−01 | −1.2013E−01 | 2.4073E−02 | −2.0980E−03 |
| R8 | −1.7556E−01 | 2.3875E−02 | −4.3471E−03 | 4.2667E−04 | −1.8793E−05 |
| R9 | −2.7287E+01 | 5.2526E−03 | −8.6847E−04 | 7.6821E−05 | −2.8218E−06 |
| R10 | −4.5597E+00 | 1.2228E−03 | −1.3503E−04 | 8.5256E−06 | −2.3251E−07 |

Table 6 shows the free-form surface data in the camera optical lens 20 according to Embodiment 2 of the present invention.

TABLE 6

| | \multicolumn{8}{c|}{Free-form surface coefficient} | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R3 | −1.6466E+02 | −3.7864E−02 | −7.7876E−02 | −3.7104E−02 | 1.4814E−01 | 4.4149E−01 | 4.4226E−01 | 1.4824E−01 |
| R4 | 2.0003E+03 | 1.6895E−01 | 3.3258E−01 | 1.6990E−01 | −2.7096E−01 | −8.1141E−01 | −8.0896E−01 | −2.7082E−01 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R3 | −1.0329E+02 | −5.1646E+01 | −1.0331E+01 | 3.7384E+01 | 2.2433E+02 | 5.6077E+02 | 7.4778E+02 | 5.6075E+02 |
| R4 | −1.7490E+02 | −8.7484E+01 | −1.7493E+01 | 6.0675E+01 | 3.6405E+02 | 9.1015E+02 | 1.2135E+03 | 9.1012E+02 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R3 | −5.6799E+02 | −8.1141E+01 | 1.0554E+02 | 8.4426E+02 | 2.9551E+03 | 5.9100E+03 | 7.3877E+03 | 5.9101E+03 |
| R4 | −8.8742E+02 | −1.2679E+02 | 1.5700E+02 | 1.2561E+03 | 4.3960E+03 | 8.7921E+03 | 1.0990E+04 | 8.7924E+03 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R3 | −9.4710E+03 | −6.3135E+03 | −2.7059E+03 | −6.7650E+02 | −7.5159E+01 | 2.2346E+01 | 2.2352E+02 | 1.0054E+03 |
| R4 | −1.3314E+04 | −8.8768E+03 | −3.8039E+03 | −9.5095E+02 | −1.0567E+02 | 2.9810E+01 | 2.9755E+02 | 1.3406E+03 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R3 | 1.3426E+00 | 5.3663E+00 | 8.0616E+00 | 5.3635E+00 | 1.3421E+00 | −1.0331E+01 | −5.1644E+01 | −1.0330E+02 |
| R4 | 2.9507E+00 | 1.1807E+01 | 1.7719E+01 | 1.1801E+01 | 2.9506E+00 | −1.7491E+01 | −8.7461E+01 | −1.7491E+02 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R3 | 2.2433E+02 | 3.7381E+01 | −8.1144E+01 | −5.6800E+02 | −1.7040E+03 | −2.8400E+03 | −2.8398E+03 | −1.7041E+03 |
| R4 | 3.6406E+02 | 6.0673E+01 | −1.2679E+02 | −8.8751E+02 | −2.6626E+03 | −4.4376E+03 | −4.4376E+03 | −2.6626E+03 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R3 | 2.9549E+03 | 8.4432E+02 | 1.0554E+02 | −7.5158E+01 | −6.7652E+02 | −2.7059E+03 | −6.3137E+03 | −9.4709E+03 |
| R4 | 4.3961E+03 | 1.2562E+03 | 1.5700E+02 | −1.0568E+02 | −9.5090E+02 | −3.8041E+03 | −8.8762E+03 | −1.3315E+04 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R3 | 2.6821E+03 | 4.6933E+03 | 5.6278E+03 | 4.6913E+03 | 2.6834E+03 | 1.0059E+03 | 2.2335E+02 | 2.2345E+01 |
| R4 | 3.5761E+03 | 6.2538E+03 | 7.5084E+03 | 6.2563E+03 | 3.5750E+03 | 1.3398E+03 | 2.9728E+02 | 2.9804E+01 |

Figure 4:
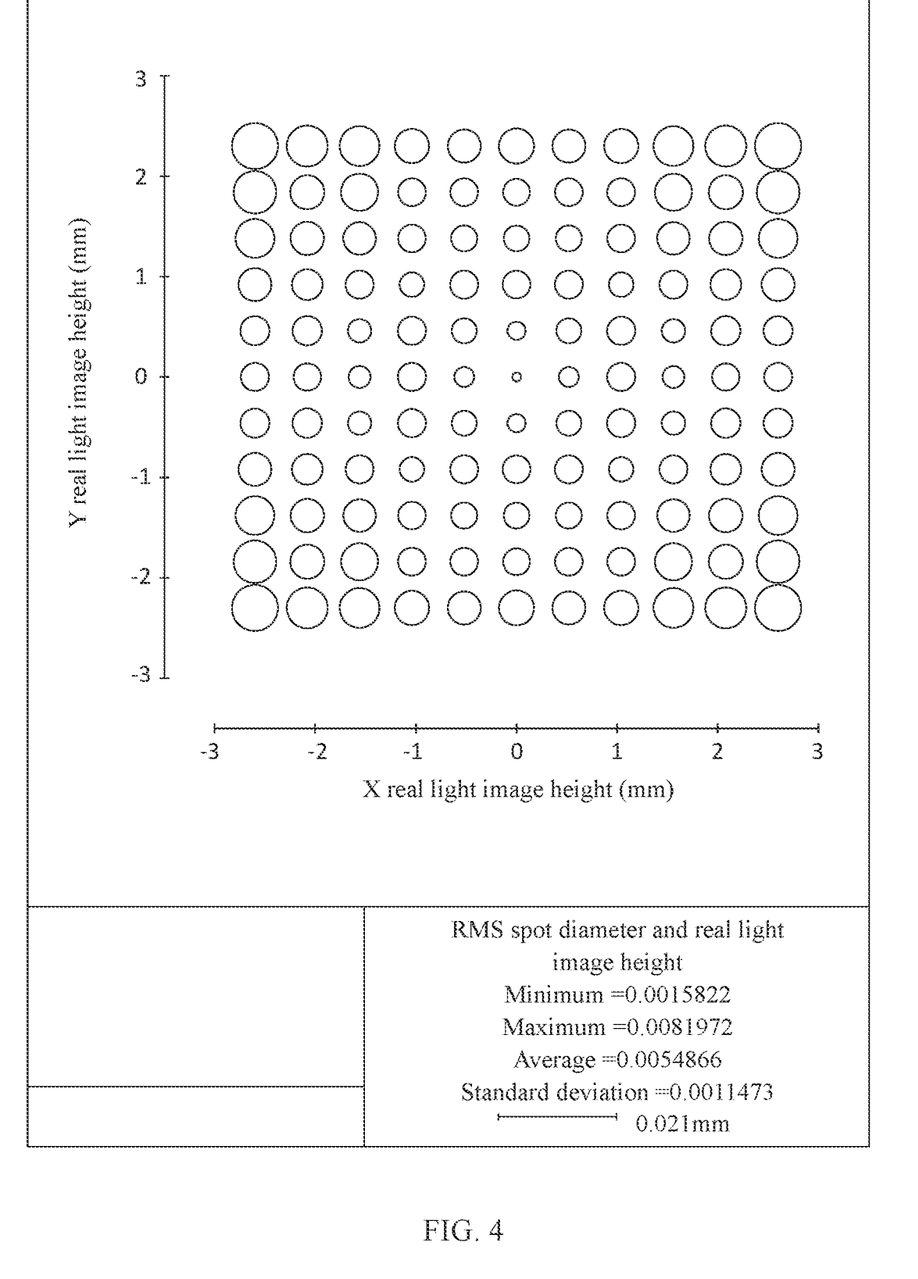
FIG. 4 illustrates correspondence between an RMS spot diameter of the camera optical lens shown in FIG. 3 and a real light image height.

FIG. 4 illustrates the correspondence between the RMS spot diameter of the camera optical lens 20 of Embodiment 2 and a real light image height. According to FIG. 4, it can be seen that the camera optical lens 20 according to Embodiment 2 can achieve good imaging quality.

Various numerical values and the parameters already specified in the conditions in this embodiments are listed in Table 13

As shown in Table 13, Embodiment 2 satisfies respective conditions.

In this embodiment, an entrance pupil diameter ENPD of the camera optical lens 20 is 1.783 mm, the full field of view image height IH (in a diagonal direction) is 6.940 mm, the image height in an x direction is 5.200 mm, the image height in a y direction is 4.600 mm, and the imaging effect is the best in this rectangular area; the field of view FOV in a diagonal direction is 86.33°, the FOV in the x direction is 70.39°, and the FOV in the y direction is 63.97°. The camera optical lens 20 satisfies the design requirements of a wide angle, ultra-thinness and a large aperture, its on-axis and off-axis color aberrations are sufficiently corrected, and the camera optical lens has excellent optical characteristics.

Embodiment 3

Embodiment 3 is basically the same as Embodiment 1, the symbols in Embodiment 3 are the same as those in Embodiment 1, and only the difference thereof will be described in the following.

Figure 5:
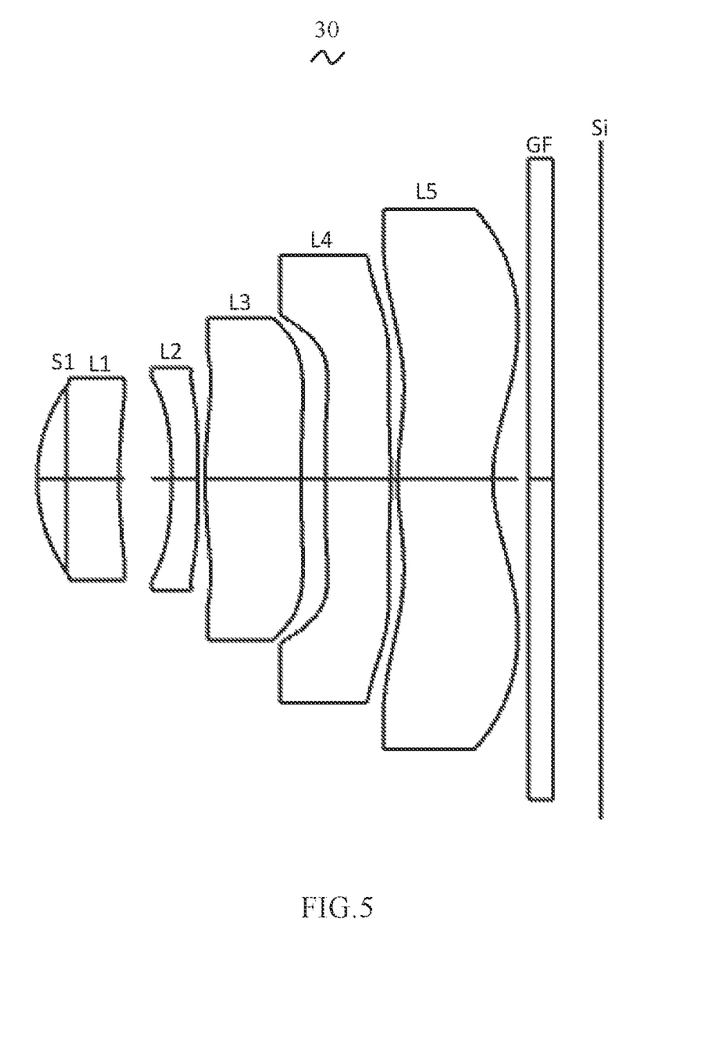
FIG. 5 is a schematic structural diagram of a camera optical lens according to Embodiment 3 of the present invention.

In this embodiment, the image side surface of the third lens L3 is a concave surface at a paraxial position.

Table 7 and Table 8 show design data of the camera optical lens 30 according to Embodiment 3 of the present invention.

TABLE 7

| | R | d | | nd | | vd | |
|---|---|---|---|---|---|---|---|
| S1 | ∞ | d0 = | −0.246 | | | | |
| R1 | 1.506 | d1 = | 0.689 | nd1 | 1.5440 | v1 | 56.40 |
| R2 | 5.103 | d2 = | 0.442 | | | | |
| R3 | −4.537 | d3 = | 0.220 | nd2 | 1.6800 | v2 | 18.40 |
| R4 | −100.000 | d4 = | 0.060 | | | | |
| R5 | 3.918 | d5 = | 0.807 | nd3 | 1.5440 | v3 | 56.40 |
| R6 | 18.015 | d6 = | 0.206 | | | | |
| R7 | −18.296 | d7 = | 0.548 | nd4 | 1.6800 | v4 | 18.40 |
| R8 | −5.917 | d8 = | 0.060 | | | | |
| R9 | 2.775 | d9 = | 0.797 | nd5 | 1.6800 | v5 | 18.40 |
| R10 | 1.437 | d10 = | 0.300 | | | | |

TABLE 7-continued

|     | R | d      |       | nd  |        | vd |       |
|-----|---|--------|-------|-----|--------|----|-------|
| R11 | ∞ | d11 =  | 0.210 | ndg | 1.5168 | vg | 64.17 |
| R12 | ∞ | d12 =  | 0.403 |     |        |    |       |

Table 8 shows aspherical data of the respective lenses in the camera optical lens 30 according to Embodiment 3 of the present invention.

TABLE 8

| | Cone coefficient | Aspherical coefficient | | | | |
|---|---|---|---|---|---|---|
| | k | A4 | A6 | A8 | A10 | A12 |
| R1 | −8.9656E−02 | 6.1661E−03 | −2.3454E−03 | 1.2730E−02 | −1.7124E−02 | 0.0000E+00 |
| R2 | 9.9133E+00 | −1.5946E−02 | −3.8610E−02 | 4.7544E−02 | −1.9777E−01 | 2.3719E−01 |
| R3 | 2.1256E+01 | −5.9496E−02 | −6.5007E−02 | 1.2290E−01 | −2.8271E−01 | 4.0640E−01 |
| R4 | 2.5000E+01 | −1.2317E−01 | 4.8870E−02 | −1.1985E−01 | 2.1096E−01 | −1.4571E−01 |
| R5 | −5.2443E+00 | −9.7391E−02 | 8.9605E−02 | −1.6498E−01 | 1.7141E−01 | −1.1282E−01 |
| R6 | −9.6670E+00 | 8.2340E−02 | −2.8453E−01 | 3.9106E−01 | −3.6231E−01 | 2.0138E−01 |
| R7 | 1.0000E+01 | 2.4853E−01 | −3.9231E−01 | 2.9926E−01 | −1.4960E−01 | 3.0322E−02 |
| R8 | 1.7189E+00 | 1.9888E−01 | −2.2013E−01 | 1.5378E−01 | −8.1035E−02 | 2.8744E−02 |

| | Cone coefficient | Aspherical coefficient | | | |
|---|---|---|---|---|---|
| | k | A14 | A16 | A18 | A20 |
| R1 | −8.9656E−02 | 0.0000E+00 | 0.0000E+00 | 0.0000E+00 | 0.0000E+00 |
| R2 | 9.9133E+00 | −1.3071E−01 | 0.0000E+00 | 0.0000E+00 | 0.0000E+00 |
| R3 | 2.1256E+01 | −1.3153E−01 | 0.0000E+00 | 0.0000E+00 | 0.0000E+00 |
| R4 | 2.5000E+01 | 8.8526E−02 | 0.0000E+00 | 0.0000E+00 | 0.0000E+00 |
| R5 | −5.2443E+00 | 3.4632E−02 | 0.0000E+00 | 0.0000E+00 | 0.0000E+00 |
| R6 | −9.6670E+00 | −6.3423E−02 | 8.7468E−03 | 0.0000E+00 | 0.0000E+00 |
| R7 | 1.0000E+01 | −4.4142E−04 | 0.0000E+00 | 0.0000E+00 | 0.0000E+00 |
| R8 | 1.7189E+00 | −6.1062E−03 | 6.9507E−04 | −3.2646E−05 | 0.0000E+00 |

Table 9 shows free-form surface data in the camera optical lens 30 according to Embodiment 3 of the present invention.

TABLE 9

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R9 | −3.1157E+00 | −1.6172E−01 | −3.2379E−01 | −1.6228E−01 | 4.2866E−03 | 1.3397E−02 | 1.3066E−02 | 5.4209E−03 |
| R10 | −5.9424E+00 | −8.9374E−02 | −1.7879E−01 | −9.0136E−02 | 3.5855E−02 | 1.0802E−01 | 1.0693E−01 | 3.6970E−02 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
|---|---|---|---|---|---|---|---|---|
| R9 | −2.6808E−01 | −1.3367E−01 | −2.6880E−02 | 4.5205E−03 | 2.7098E−02 | 6.7793E−02 | 9.0229E−02 | 6.7896E−02 |
| R10 | 3.5690E−02 | 1.7871E−02 | 3.6894E−03 | −8.6582E−04 | −5.1972E−03 | −1.2996E−02 | −1.7253E−02 | −1.3043E−02 |

| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
|---|---|---|---|---|---|---|---|---|
| R9 | 3.7750E−03 | 5.6670E−04 | −3.2861E−04 | −2.6254E−03 | −9.1936E−03 | −1.8394E−02 | −2.2985E−02 | −1.8388E−02 |
| R10 | 1.2442E−03 | 1.7300E−04 | −2.7467E−05 | −2.1991E−04 | −7.6934E−04 | −1.5418E−03 | −1.9325E−03 | −1.5308E−03 |

| | $X^4Y^{10}$ | $X^2Y^{12}$ | $X^0Y^{14}$ | $X^{20}Y^0$ | $X^{18}Y^2$ | $X^{16}Y^4$ | | |

| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
|---|---|---|---|---|---|---|---|---|
| R9 | 6.0240E−03 | 4.0035E−03 | 1.7144E−03 | 4.2614E−04 | 4.3603E−05 | −2.4058E−06 | −2.4291E−05 | −1.0952E−04 |
| R10 | 3.2298E−04 | 2.1626E−04 | 9.1509E−05 | 2.2728E−05 | 3.0272E−06 | −1.0282E−07 | −1.0117E−06 | −4.5955E−06 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R9 | 5.1675E−02 | 2.0669E−01 | 3.1060E−01 | 2.0590E−01 | 5.1119E−02 | −2.6784E−02 | −1.3406E−01 | −2.6807E−01 |
| R10 | −1.2617E−02 | −5.0571E−02 | −7.5494E−02 | −5.0244E−02 | −1.3214E−02 | 3.5792E−03 | 1.7893E−02 | 3.5751E−02 |

| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
|---|---|---|---|---|---|---|---|---|
| R9 | 2.7188E−02 | 4.5608E−03 | 5.4014E−04 | 3.7853E−03 | 1.1358E−02 | 1.8919E−02 | 1.8954E−02 | 1.1336E−02 |
| R10 | −5.1897E−03 | −8.5293E−04 | 1.7823E−04 | 1.2479E−03 | 3.7494E−03 | 6.2318E−03 | 6.2397E−03 | 3.7534E−03 |

TABLE 9-continued

|     | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
|-----|-------------|-------------|-------------|-------------|-------------|-------------|-------------|-------------|
| R9  | −9.2123E−03 | −2.6370E−03 | −3.2429E−04 | 4.7674E−05  | 4.2983E−04  | 1.7190E−03  | 4.0155E−03  | 6.0215E−03  |
| R10 | −7.6666E−04 | −2.2290E−04 | −2.8683E−05 | 2.5609E−06  | 2.3000E−05  | 9.1986E−05  | 2.1585E−04  | 3.2259E−04  |

|     | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
|-----|-------------|-------------|----------------|-------------|-------------|-------------|-------------|-------------|
| R9  | −2.9243E−04 | −5.1019E−04 | −6.1403E−04    | −5.1210E−04 | −2.8932E−04 | −1.0489E−04 | −2.4006E−05 | −1.9975E−06 |
| R10 | −1.2344E−05 | −2.1448E−05 | −2.5193E−05    | −2.2144E−05 | −1.2700E−05 | −4.6911E−06 | −4.7293E−07 | −1.3059E−07 |

Figure 6:
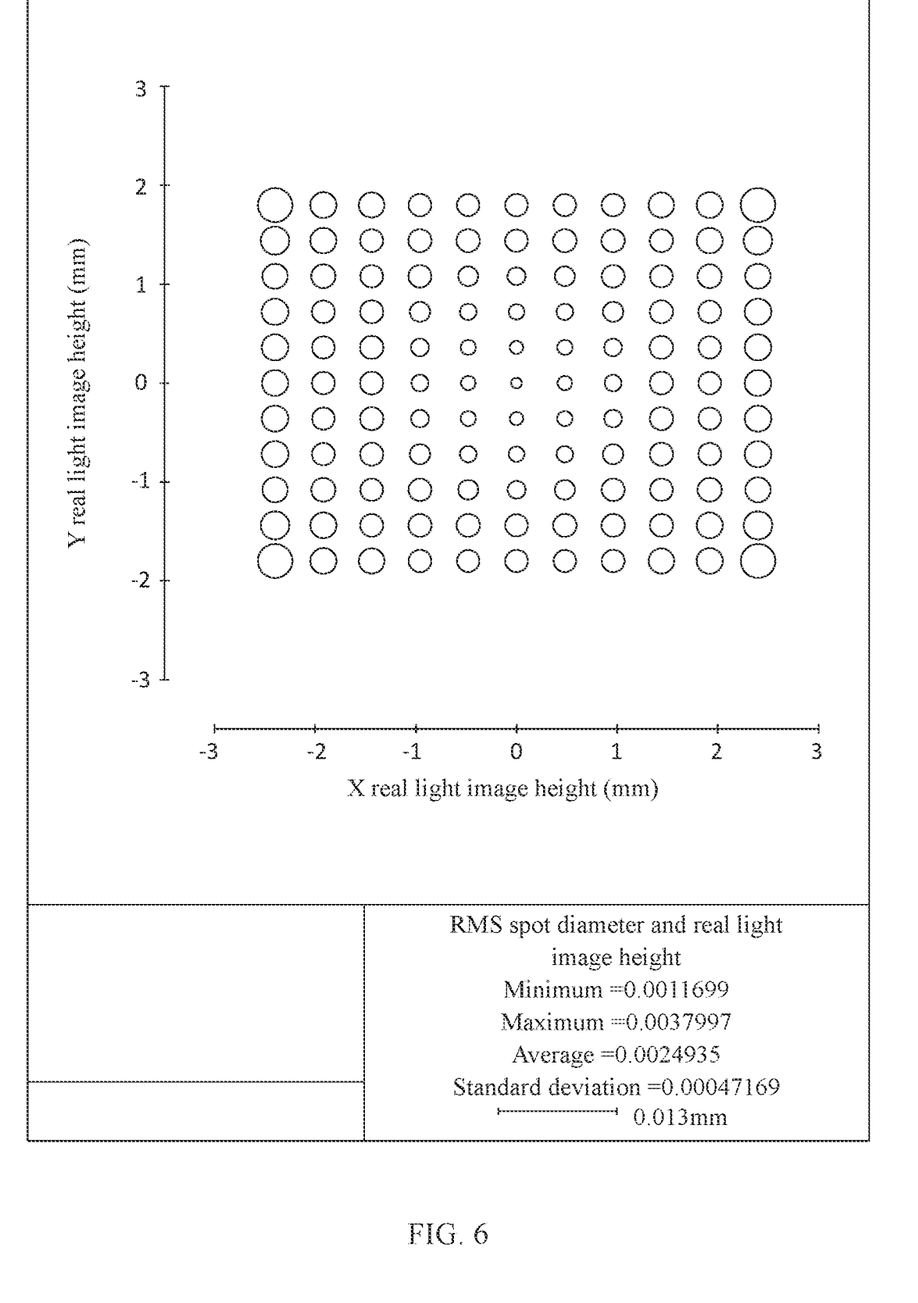
FIG. 6 illustrates correspondence between an RMS spot diameter of the camera optical lens shown in FIG. 5 and a real light image height.

FIG. 6 illustrates correspondence between the RMS spot diameter of the camera optical lens 30 of Embodiment 3 and a real light image height. According to FIG. 6, it can be seen that the camera optical lens 30 according to Embodiment 3 can achieve good imaging quality.

The numerical value corresponding to the respective conditions in this embodiment are listed in Table 13. It can be seen that the imaging optical system according to this embodiment satisfies the above-mentioned conditions.

In this embodiment, an entrance pupil diameter ENPD of the camera optical lens 30 is 1.682 mm, the full field of view image height IH (in a diagonal direction) is 6.000 mm, the image height in an x direction is 4.800 mm, the image height in a y direction is 3.600 mm, and the imaging effect is the best in this rectangular area; the field of view FOV in a diagonal direction is 78.00°, the FOV in the x direction is 65.69°, and the FOV in the y direction is 51.24°. The camera optical lens 30 satisfies the design requirements of a wide angle, ultra-thinness and a large aperture, its on-axis and off-axis color aberrations are sufficiently corrected, and the camera optical lens has excellent optical characteristics.

Embodiment 4

Embodiment 4 is basically the same as Embodiment 1, the symbols in Embodiment 4 are the same as those in Embodiment 1, and only the difference thereof will be described in the following.

Figure 7:
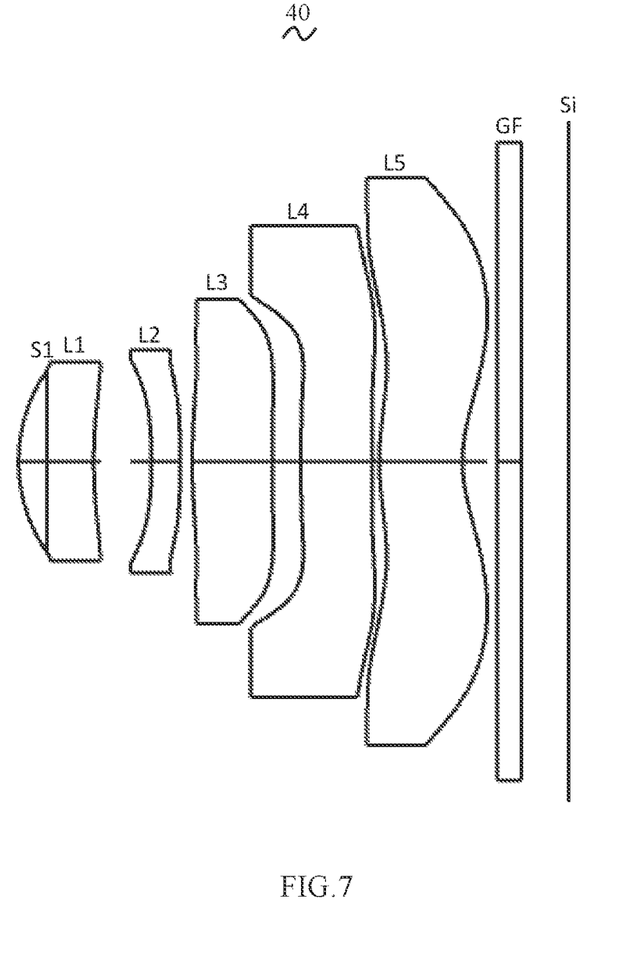
FIG. 7 is a schematic structural diagram of a camera optical lens according to Embodiment 4 of the present invention.

In this embodiment, the image side surface of the third lens L3 is a concave surface at a paraxial position.

Table 10 and Table 11 show design data of the camera optical lens 40 according to Embodiment 4 of the present invention. Herein, only the object side surface and the image side surface of the first lens L1 are free-form surfaces, but in other embodiment, more than one lens may have the free-form surface.

TABLE 10

|     | R        | d    |       | nd  |        | vd  |       |
|-----|----------|------|-------|-----|--------|-----|-------|
| S1  | ∞        | d0 = | −0.245|     |        |     |       |
| R1  | 1.529    | d1 = | 0.650 | nd1 | 1.5440 | v1  | 56.40 |
| R2  | 4.786    | d2 = | 0.500 |     |        |     |       |
| R3  | −4.610   | d3 = | 0.249 | nd2 | 1.6800 | v2  | 18.40 |
| R4  | −9.709   | d4 = | 0.102 |     |        |     |       |
| R5  | 5.833    | d5 = | 0.694 | nd3 | 1.5440 | v3  | 56.40 |
| R6  | 22.823   | d6 = | 0.248 |     |        |     |       |
| R7  | −153.933 | d7 = | 0.617 | nd4 | 1.6800 | v4  | 18.40 |
| R8  | −10.282  | d8 = | 0.060 |     |        |     |       |
| R9  | 2.653    | d9 = | 0.721 | nd5 | 1.6800 | v5  | 18.40 |
| R10 | 1.422    | d10 =| 0.300 |     |        |     |       |
| R11 | ∞        | d11 =| 0.210 | ndg | 1.5168 | vg  | 64.17 |
| R12 | ∞        | d12 =| 0.404 |     |        |     |       |

Table 11 shows aspherical data of the respective lenses in the camera optical lens 40 according to Embodiment 4 of the present invention.

TABLE 11

|     | Cone coefficient | Aspherical coefficient | | | | |
|-----|------------------|------------|------------|------------|------------|------------|
|     | k                | A4         | A6         | A8         | A10        | A12        |
| R3  | 2.0049E+01       | −6.7862E−02| −1.3474E−01| 3.9914E−01 | −8.6214E−01| 1.1152E+00 |
| R4  | −1.0000E+01      | −6.1707E−02| −1.9034E−01| 4.4613E−01 | −5.8417E−01| 5.0877E−01 |
| R5  | 6.8039E+00       | −1.8979E−02| −1.1279E−01| 1.7244E−01 | −1.6635E−01| 8.8700E−02 |
| R6  | 1.0000E+01       | 4.2957E−02 | −1.6986E−01| 1.9071E−01 | −1.5553E−01| 7.6675E−02 |
| R7  | 1.0000E+01       | 1.6656E−01 | −2.5736E−01| 1.5164E−01 | −5.3716E−02| 1.4198E−03 |
| R8  | 7.9503E+00       | 1.9454E−01 | −2.1764E−01| 1.3570E−01 | −5.7343E−02| 1.6076E−02 |
| R9  | −2.7452E+00      | −1.3157E−01| −2.7298E−02| 6.4969E−02 | −2.9908E−02| 5.4835E−03 |
| R10 | −5.2778E+00      | −9.9957E−02| 4.2760E−02 | −1.7461E−02| 6.3161E−03 | −1.8838E−03|

|     | Cone coefficient | Aspherical coefficient | | | |
|-----|------------------|------------|------------|------------|------------|
|     | k                | A14        | A16        | A18        | A20        |
| R3  | 2.0049E+01       | −4.9657E−01| 0.0000E+00 | 0.0000E+00 | 0.0000E+00 |
| R4  | −1.0000E+01      | −1.5015E−01| 0.0000E+00 | 0.0000E+00 | 0.0000E+00 |
| R5  | 6.8039E+00       | −1.7851E−02| 0.0000E+00 | 0.0000E+00 | 0.0000E+00 |
| R6  | 1.0000E+01       | −2.2413E−02| 3.1268E−03 | 0.0000E+00 | 0.0000E+00 |
| R7  | 1.0000E+01       | 2.4322E−03 | 0.0000E+00 | 0.0000E+00 | 0.0000E+00 |
| R8  | 7.9503E+00       | −2.7763E−03| 2.6413E−04 | −1.0552E−05| 0.0000E+00 |
| R9  | −2.7452E+00      | 8.3669E−05 | −1.9792E−04| 2.9828E−05 | −1.4810E−06|
| R10 | −5.2778E+00      | 4.1663E−04 | −6.1366E−05| 5.2245E−06 | −1.9091E−07|

Table 12 shows free-form surface data in the camera optical lens 40 according to Embodiment 4 of the present invention.

TABLE 12

| | \multicolumn{8}{c}{Free-form surface coefficient} | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | −1.1434E−01 | 6.5583E−03 | 1.2263E−02 | 6.2745E−03 | −3.9438E−03 | −8.5743E−03 | −7.0410E−03 | −2.3442E−03 |
| R2 | 9.8691E+00 | −1.5527E−02 | −3.0947E−02 | −1.5596E−02 | −5.1003E−02 | −1.5121E−01 | −1.5226E−01 | −4.9572E−02 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^4Y^8$ |
| R1 | −1.5969E−01 | −7.7301E−02 | −1.5532E−02 | 0.0000E+00 | 0.0000E+00 | 0.0000E+00 | 0.0000E+00 | 0.0000E+00 |
| R2 | −3.5221E+00 | −1.8266E+00 | −3.6489E−01 | 4.3601E−01 | 2.6545E+00 | 6.6910E+00 | 8.6657E+00 | 6.3977E+00 |
| | $X^2Y^{12}$ | $X^0Y^{14}$ | $X^{16}Y^0$ | $X^{14}Y^2$ | $X^{12}Y^4$ | $X^{10}Y^6$ | $X^8Y^8$ | $X^6Y^{10}$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | −1.6010E+00 | −2.2632E−01 | 0.0000E+00 | 0.0000E+00 | 0.0000E+00 | 0.0000E+00 | 0.0000E+00 | 0.0000E+00 |
| | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ | $X^{16}Y^4$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R1 | 1.3365E−02 | 4.7705E−02 | 7.1845E−02 | 4.3431E−02 | 1.0791E−02 | −1.6888E−02 | −7.9620E−02 | −1.6213E−01 |
| R2 | 1.2205E−01 | 4.7649E−01 | 7.0529E−01 | 4.8089E−01 | 1.1840E−01 | −3.6412E−01 | −1.8158E+00 | −3.6012E+00 |
| | $X^2Y^{10}$ | $X^0Y^{12}$ | $X^{14}Y^0$ | $X^{12}Y^2$ | $X^{10}Y^4$ | $X^8Y^6$ | $X^6Y^8$ | $X^4Y^{10}$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 2.6876E−01 | 4.4636E−01 | −2.1839E−01 | −1.5624E+00 | −4.8060E+00 | −7.8354E+00 | −7.6556E+00 | −4.5563E+00 |
| | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ | $X^{10}Y^8$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |
| | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ | $X^0Y^{20}$ |
| R1 | 0.0000E+00 | 0.0000E+00 | 0.0000E+00 | 0.0000E+00 | 0.0000E+00 | 0.0000E+00 | 0.0000E+00 | 0.0000E+00 |
| R2 | 0.0000E+00 | 0.0000E+00 | 0.0000E+00 | 0.0000E+00 | 0.0000E+00 | 0.0000E+00 | 0.0000E+00 | 0.0000E+00 |

Figure 8:
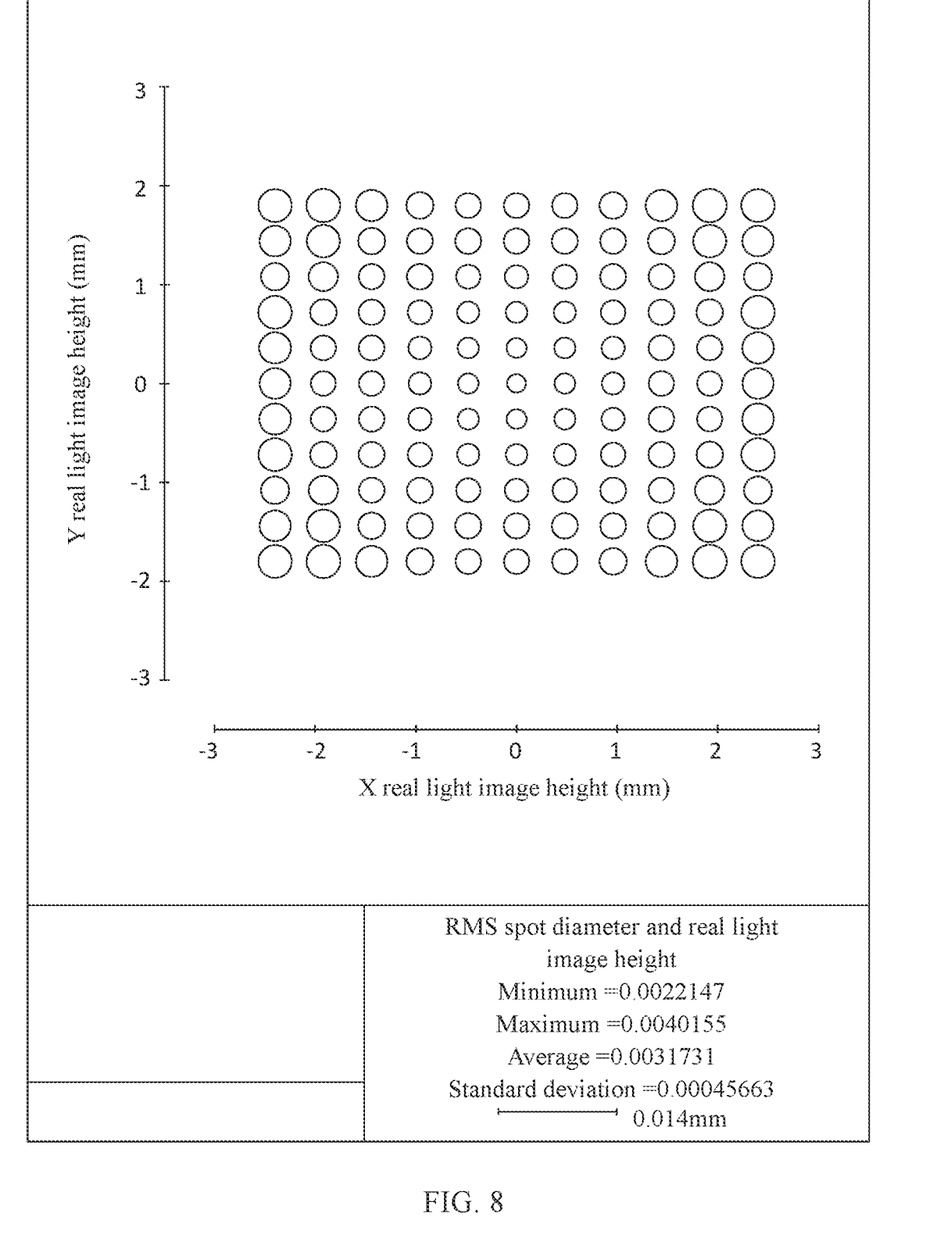
FIG. 8 illustrates correspondence between an RMS spot diameter of the camera optical lens shown in FIG. 7 and a real light image height.

FIG. 8 illustrates correspondence between an RMS spot diameter of the camera optical lens of Embodiment 4 and a real light image height. According to FIG. 8, it can be seen that the camera optical lens 40 according to Embodiment 4 can achieve good imaging quality.

The numerical values corresponding to the respective conditions in this embodiment according to the above-mentioned conditions are listed in Table 13. It can be seen that the imaging optical system according to this embodiment satisfies the above-mentioned conditions.

In this embodiment, an entrance pupil diameter ENPD of the camera optical lens 40 is 1.695 mm, the full field of view image height IH (in a diagonal direction) is 6.000 mm, the image height in an x direction is 4.800 mm, the image height in a y direction is 3.600 mm, and the imaging effect is the best in this rectangular area; the field of view FOV in a diagonal direction is 77.50°, the FOV in the x direction is 64.95°, and the FOV in the y direction is 50.70°. The camera optical lens 40 satisfies the design requirements of a wide angle, ultra-thinness and a large aperture, its on-axis and off-axis color aberrations are sufficiently corrected, and the camera optical lens has excellent optical characteristics.

TABLE 13

| Parameters and conditions | Embodiment 1 | Embodiment 2 | Embodiment 3 | Embodiment 4 |
|---|---|---|---|---|
| f3/f | 4.35 | 5.47 | 2.43 | 3.79 |
| R4/R3 | 8.98 | 8.76 | 22.04 | 2.11 |
| f | 3.540 | 3.566 | 3.700 | 3.730 |
| f1 | 3.342 | 3.282 | 3.663 | 3.843 |
| f2 | −7.427 | −7.590 | −6.907 | −13.007 |
| f3 | 15.404 | 19.498 | 8.982 | 14.139 |
| f4 | 3.875 | 3.919 | 12.471 | 15.969 |
| f5 | −2.718 | −2.820 | −5.715 | −5.842 |
| FNO | 2.00 | 2.00 | 2.20 | 2.20 |
| TTL | 4.382 | 4.384 | 4.742 | 4.755 |
| IH | 6.940 | 6.940 | 6.000 | 6.000 |
| FOV | 87.13° | 86.33° | 78.00° | 77.50° |

It should be understood by those skilled in the art that the above embodiments are merely some specific embodiments of the present invention, and various changes in form and details may be made without departing from the scope of the present invention.

What is claimed is:

1. A camera optical lens, comprising, from an object side to an image side:
   a first lens having a positive refractive power;
   a second lens having a negative refractive power;
   a third lens having a positive refractive power;

a fourth lens having a positive refractive power; and
a fifth lens having a negative refractive power,
wherein at least one of the first lens to the fifth lens has a free-form surface,
wherein the camera optical lens satisfies following conditions:

$$2.00 \le f3/f \le 5.50;$$

$$-3.88 \le (R1+R2)/(R1-R2) \le -1.02;$$

$$-3.37 \le (R5+R6)/(R5-R6) \le -0.16; \text{ and}$$

$$2.00 \le R4/R3 \le 23.00;$$

where f is a focal length of the camera optical lens, f3 is a focal length of the third lens, R1 is a central curvature radius of an object side surface of the first lens, R2 is a central curvature radius of an image side surface of the first lens, R3 is a central curvature radius of an object side surface of the second lens, R4 is a central curvature radius of an image side surface of the second lens, R5 is a central curvature radius of an object side surface of the third lens, and R6 is a central curvature radius of an image side surface of the third lens.

2. The camera optical lens as described in claim 1, wherein the camera optical lens further satisfies a following condition:

$$1.00 \le d7/d8 \le 11.00$$

where d7 is an on-axis thickness of the fourth lens, and d8 is an on-axis distance from an image side surface of the fourth lens to an object side surface of the fifth lens.

3. The camera optical lens as described in claim 1, wherein the camera optical lens further satisfies following conditions:

$$0.46 \le f1/f \le 1.55;$$

and $$0.06 \le d1/TTL \le 0.22,$$

where f1 is a focal length of the first lens, d1 is an on-axis thickness of the first lens, and TTL is a total optical length from the object side surface of the first lens to an image plane of the camera optical lens along an optic axis.

4. The camera optical lens as described in claim 1, wherein the camera optical lens further satisfies following conditions:

$$-6.97 \le f2/f \le -1.24;$$

$$-5.62 \le (R3+R4)/(R3-R4) \le -0.73; \text{ and}$$

$$0.02 \le d3/TTL \le 0.08,$$

where f2 is a focal length of the second lens, d3 is an on-axis thickness of the second lens, and TTL is a total optical length from an object side surface of the first lens to an image plane of the camera optical lens along an optic axis.

5. The camera optical lens as described in claim 1, wherein the camera optical lens further satisfies a following condition:

$$0.03 \le d5/TTL \le 0.26,$$

where d5 is an on-axis thickness of the third lens, and TTL is a total optical length from an object side surface of the first lens to an image plane of the camera optical lens along an optic axis.

6. The camera optical lens as described in claim 1, wherein the camera optical lens further satisfies following conditions:

$$0.55 \le f4/f \le 6.42;$$

$$0.57 \le (R7+R8)/(R7-R8) \le 2.93; \text{ and}$$

$$0.06 \le d7/TTL \le 0.19,$$

where f4 is a focal length of the fourth lens, R7 is a central curvature radius of an object side surface of the fourth lens, R8 is a central curvature radius of an image side surface of the fourth lens, d7 is an on-axis thickness of the fourth lens, and TTL is a total optical length from an object side surface of the first lens to an image plane of the camera optical lens along an optic axis.

7. The camera optical lens as described in claim 1, wherein the camera optical lens further satisfies following conditions:

$$-3.13 \le f5/f \le -0.51;$$

$$0.74 \le (R9+R10)/(R9-R10) \le 4.97; \text{ and}$$

$$0.05 \le d9/TTL \le 0.25,$$

where f5 is a focal length of the fifth lens, R9 is a central curvature radius of an object side surface of the fifth lens, R10 is a central curvature radius of an image side surface of the fifth lens, d9 is an on-axis thickness of the fifth lens, and TTL is a total optical length from an object side surface of the first lens to an image plane of the camera optical lens along an optic axis.

8. The camera optical lens as described in claim 1, wherein the camera optical lens further satisfies a following condition:

$$TTL/IH \le 1.60,$$

where TTL is a total optical length from an object side surface of the first lens to an image plane of the camera optical lens along an optic axis, and IH is an image height of the camera optical lens.

9. The camera optical lens as described in claim 1, wherein the camera optical lens further satisfies a following condition:

$$FOV \ge 77°,$$

where FOV is a field of view of the camera optical lens.

10. The camera optical lens as described in claim 1, wherein the camera optical lens further satisfies a following condition:

$$FNO \le 2.21,$$

where FNO is an F number of the camera optical lens.

* * * * *